United States Patent [19]

Hamrick et al.

[11] 4,143,522
[45] Mar. 13, 1979

[54] WINDMILL OPERATED SYSTEM

[75] Inventors: Joseph T. Hamrick, Roanoke; Leslie C. Rose, Rocky Mount, both of Va.

[73] Assignee: World Energy Systems, Fort Worth, Tex.

[21] Appl. No.: 838,203

[22] Filed: Sep. 30, 1977

[51] Int. Cl.² ............................................. F25B 13/00
[52] U.S. Cl. .................................... 62/324; 126/247; 417/334; 60/398
[58] Field of Search .................. 60/329, 398, 456, 468, 60/515, 641; 62/324, 115; 126/247; 417/334

[56] References Cited

U.S. PATENT DOCUMENTS

| | | | |
|---|---|---|---|
| 2,652,699 | 9/1953 | Romani | 62/324 X |
| 2,764,147 | 9/1956 | Brunner | 126/247 |
| 3,752,395 | 8/1973 | Ashikian | 60/641 X |
| 3,783,858 | 1/1974 | Ashikian | 126/247 |
| 3,952,723 | 4/1976 | Browning | 126/247 |
| 3,989,189 | 11/1976 | Kita | 126/247 X |

Primary Examiner—Edgar W. Geoghegan
Attorney, Agent, or Firm—Wofford, Felsman, Fails & Zobal

[57] ABSTRACT

A windmill drives a fluid pump which operates a hydraulic motor. In one embodiment, the mechanical output of the hydraulic motor operates a heat pump employed for heating and/or cooling purposes. In another embodiment, the fluid discharge from the hydraulic motor is recirculated through a fluid reservoir. The heat of the fluid in the reservoir, resulting from the inefficiency of the pump and the hydraulic motor, is employed for heating purposes.

7 Claims, 2 Drawing Figures

WINDMILL OPERATED SYSTEM

SUMMARY OF THE INVENTION

It is an object of the present invention to provide a windmill heating and/or cooling system.

It is a further object of the present invention to provide a new heating and/or cooling system comprising a windmill for driving a fluid pump which operates a fluid driven power means. In one embodiment, the mechanical output of the fluid driven power means operates a heat pump employed for heating and/or cooling purposes. In another embodiment, the fluid discharge from the fluid driven power means is recirculated through a fluid reservoir. The heat of the fluid in the reservoir, resulting from the inefficiency of said pump means and said fluid driven power means, is employed by utilization means for heating purposes.

DESCRIPTION OF THE PREFERRED EMBODIMENT

Figure 1:
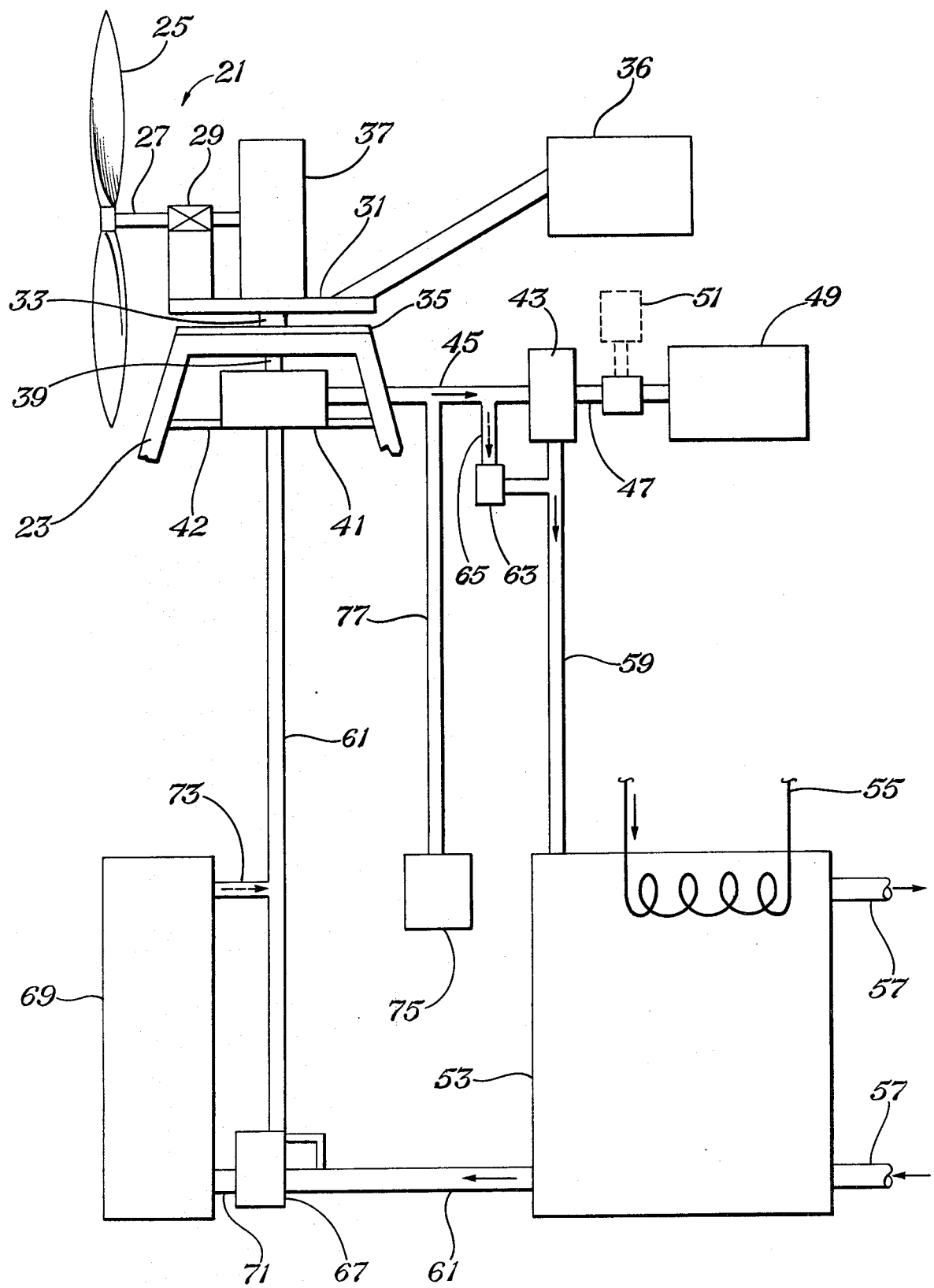
FIG. 1 illustrates a block diagram of the system of the present invention.

Referring now to FIG. 1, there is illustrated a windmill 21 supported on a pedestal 23 which is shown only partially for purposes of clarity. The windmill 21 comprises a wind driven propeller 25 connected to a shaft 27 which is supported for rotation by bearings 29 mounted on a platform 31. Platform 31 is supported to be turned on a shaft 33 which is connected to a base 35 mounted on the top of the pedestal 23. Tail fin 36 is used to counter torque and keep the propeller 25 facing the wind. As the propeller 25 is turned by the wind, the shaft 27 drives a speed increaser and gear system 37. Power is transmitted from the speed increaser 37 through a shaft 39 to a pump 41 connected to the pedestal 23 by rods 42. The shaft 39 extends through shaft 33. The fluid outlet of the pump 41 is connected to the fluid inlet of a hydraulic motor 43 by way of conduit 45. The output shaft 47 of the hydraulic motor 43 is used to drive a compressor of a heat pump 49 for heating or cooling as needed for a building, residence, or for other use. The heat pump is a conventional system and will be described subsequently. In times of low wind velocity, the heat pump 49 may be driven by a natural gas engine or electric motor 51.

With the use of fluid pumps and hydraulic motors or turbines, fluid friction losses may be of the order of 20% to 40% of the work input. When the working fluid is recirculated, the fluid temperature will rise continuously unless the fluid is cooled. The rise in temperature of the working fluid may be utilized by passing the fluid into a reservoir 53 which is used to store heat during times of low wind velocity. The heat may be used for heating potable water flowing through conduit 55 or for space heating for residential or building purposes by flowing the working fluid through conduits illustrated at 57.

The working fluid from hydraulic motor 43 is piped to reservoir 53 by way of conduit 59 which extends from the fluid outlet of the hydraulic motor 43 to the reservoir 53. The working fluid is recirculated by way of conduit 61 which extends from the reservoir 53 to the fluid inlet of the pump 41.

In order to prevent over speeding of the hydraulic motor 43 in times of high wind, pressure operated one way valve 63 is coupled between conduits 45 and 59 by way of conduit 65. The valve 63 may be a spring loaded valve which opens at a preset pressure level. In times of high wind, the valve 63 opens and by-passes some of the operating fluid directly into the reservoir 53. The valve 63 thus regulates the flow of the operating fluid to the hydraulic motor 43.

In times of high wind, when fluid friction results in heat build-up in excess of needs, the operating fluid in conduit 61 may be by-passed by a temperature controlled, three-way valve 67 into a heat exchanger 69 where it is cooled before being returned to the inlet of the pump 41. As shown, valve 67 has two ports connected to conduit 61 and a third port connected to conduit 71 which leads to heat exchanger 69. The outlet of the heat exchanger 69 is connected to conduit 61 down stream of valve 67 by way of conduit 73. In operation, the temperature controlled three-way valve 67 will direct the operating fluid directly to the inlet of pump 41 or to cooler 69 which exchanges heat with atmospheric air.

The pump 41 may be of the positive displacement type or the centrifugal type. The centrifugal type is simpler in construction and can pump water or oil with ease, whereas, the positive displacement type generally requires the use of a fluid which also is a lubricant for long term operation. Special positive displacement pumps for water are available. For the flow rates that would be involved in heating or cooling a home, the centrifugal type would be less efficient than the positive displacement type, and could be less desirable for summer operation where the heat generated as a result of losses would require an auxiliary adsorption or absorption type cooling system to be of use in air conditioning.

The hydraulic motor 43 may be of the positive displacement type if a positive displacement pump is used or a turbine type if a centrifugal pump is used. The system pressure between the pump 41 and motor 43 would be much higher with a positive displacement pump than with a centrifugal pump. With high pressure, positive displacement systems, an air or nitrogen charged pressure accumulator 75 may be used to store pressure for operating motor 43 during brief periods of low wind velocity. As shown, accumulator 75 is connected to conduit 45 by way of conduit 77. One advantage of using centrifugal type pumps is that both the power output of the windmill and the power absorbed by a centrifugal pump vary as the cube of the rotational speed. Thus, the pump is automatically matched to the windmill for any wind velocity. With the use of a positive displacement pump, a speed control mechanism will be required for the windmill. These exist on commercially available windmills. One example of a speed control device is one in which the propeller blades are attached to the hub by a spring loaded cam directed positioner. As centrifugal force on the blade increases with rotative speed, it moves the positioner outward against the spring causing the cam to turn the blade toward the feathered position and thereby reducing rotative speed.

Reversed refrigeration systems, also known as heat pumps, can greatly increase the heating capacity of a windmill. With a reversed refrigeration system, heat can be extracted from a cold reservoir and transferred to a warm reservoir, the effectiveness of the system increasing as the temperature in the cold reservoir approaches that of the warm reservoir. In a commercially available reversed refrigeration system, the amount of heat produced by the system with the outside temperature at 35° F. and inside temperature at 70° F. is approximately twice that could be derived from simple resistance type heaters.

The Heil-Quaker Corporation has published the data shown in table 1 for one of their electrically driven heat pumps. The inside temperature is 70° F. (dry bulb).

Table 1

| Outside Temp. °F | Watts Input | Btu/hr. Input | Btu/hr. Output | Coefficient of Performance |
|---|---|---|---|---|
| 60 | 3840 | 13,106 | 36,500 | 2.79 |
| 50 | 3570 | 12,184 | 31,600 | 2.60 |
| 40 | 3280 | 11,195 | 26,700 | 2.39 |
| 30 | 3060 | 10,444 | 22,100 | 2.12 |
| 15 | 2750 | 9,386 | 16,000 | 1.71 |
| 10 | 2675 | 9,130 | 14,000 | 1.54 |

An example propeller type windmill can be sized for use in the Atlanta, Ga. area where the average wind velocity is 12 miles per hour. For an average house with 1600 square feet of floor space with 8 ft. ceilings with the number of degree days from October 1 to May 1 being 2890 the total estimated average heat requirement is 9450 Btu per hour and the average outside temperature is 51° F. It can be shown that with a pump efficiency of 75 percent and turbine or motor efficiency of 90 percent a 20 ft. diameter propeller windmill at a wind velocity of 12 mph can produce the energy equivalent of 4597 Btu/hr. at 92 rpm. With a 75 percent efficient pump and 90 percent efficient turbine or motor the energy available for driving a heat pump equals 3103 Btu/hr. From table 1 the coefficient of performance at 50° F. is 2.6. Therefore, for an input to the heat pump of 3103 Btu/hr. the output heat from the heat pump would be 8068 Btu/hr. Heat input to the liquid due to pump and turbine inefficiency would be the difference between 4597 Btu/hr. and 3103 Btu/hr. or 1494 Btu/hr. If a 7 percent heat loss is assumed for the circulating fluid the total heat available for heating the house is 8068 Btu/hr. + 1389 Btu/hr. = 9457 Btu per hour or approximately the average required. It is obvious that the foregoing calculations, which are based on averages are subject to day to day correction for variations in wind and temperature. The impact of such variations can be reduced by maintaining a large water reservoir to store heat generated by pump and turbine inefficiencies or a bed of rocks to store heat generated by the heat pump.

The heat pump functions as an air conditioner in the summer, in which case, the rock bed can be cooled during periods of high wind to provide cooling in times of low wind. Water and rock bed reservoirs built for use in conjunction with solar heating can be used with the windmill system.

Figure 2:
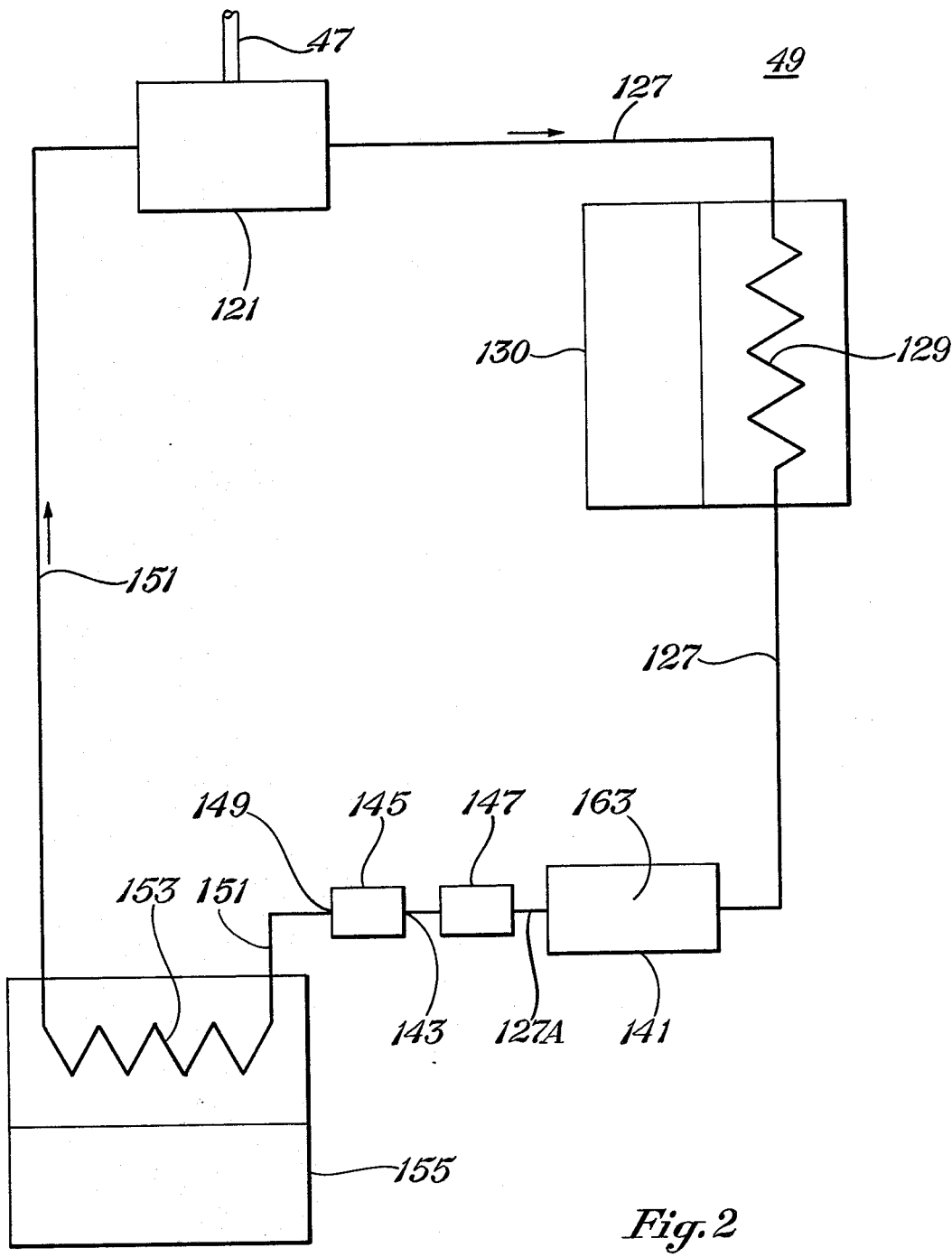
FIG. 2 illustrates in more detail the heat pump of the system of FIG. 1.

Referring now to FIG. 2, there will be described briefly, the basic components of the heat pump 49 having a compressor 121 operated by the output shaft 47 of the hydraulic motor 43. A conduit 127 is attached to the outlet of the compressor 121 and is formed in a coil 129. A blower 130 is provided to blow air around the coil 129. The other end of conduit 127 is attached to the inlet of a receiver 141. The outlet of the receiver 141 is attached to the inlet 143 of an expansion valve 145 by way of conduit 127A. Reference numeral 147 identifies a filter. The outlet 149 of the expansion valve is attached to a conduit 151 which is formed in a coil 153. The other end of the conduit 151 is attached to the inlet of the compressor 121. Reference numeral 155 identifies a blower for blowing air around coil 153. Both of coils 129 and 153 may be located inside of a residence or building.

The system comprising compressor 121, conduit 127 and coil 129, expansion valve 145 and conduit 151 and coil 153 is a closed system containing a refrigerant identified at 163, which may be for example trichloromonofluoromethane also known as Freon-11. It is to be understood that other types of refrigerants may be used. The system operates to heat the coils 129 for heating purposes and to cool the coils 153 for cooling purposes in the summer or to dehumidify the air.

The operation of the system now will be described. Starting with the compressor 121, the refrigerant 163 on the inlet side of the compressor 121 is compressed and then passes into coils 129 where it cools and condenses giving up its heat of condensation. The blower 130 circulates air around the coil 129 where it is heated and used for space heating. After condensing and leaving the coil 129, the refrigerant 163 collects in tank receiver 141. It passes through filter 147 and the thermostatically controlled expansion valve 145. When liquid refrigerant 163 passes through valve 145 into the region of low pressure, it evaporates and provides cooling for coil 153. The blower 155 circulates air across the coils 153 where it is cooled and dehumidified. Thus, the system also serves to cool and dehumidify. From the coil 153, the refrigerant 163 returns to the compressor 121 through line 151.

Although not shown, suitable controls will be provided to control the opening and closing of the expansion valve 145 as a function of preset temperature of the coils 129 and 153 dependent upon whether the system is used for heating or cooling at a given time. Suitable venting devices also may be provided to vent the coils 129 and 153 to the exterior of the residence or building when they are not needed for heating or cooling purposes. Although not shown, conventional electric power may be employed to operate the blowers 130 and 155 and the control system.

As a further embodiment, coil 129 may be located in a water tank for heating water as disclosed and claimed in our co-pending Patent Application Ser. No. 833,900 entitled System For Heating Water Filed Sept. 16, 1977. In this embodiment, the blower 130 will be eliminated.

We claim:
1. A system for extracting useful energy from the wind, comprising:
 pump means having a fluid inlet and a fluid outlet,
 fluid driven power means having a fluid inlet, a fluid outlet, and a mechanical output,
 reservoir means for holding an operating fluid,
 conduit means for providing fluid communication from said fluid outlet of said pump means to said fluid inlet of said fluid driven power means; from said fluid outlet of said fluid driven power means to said reservoir; and from said reservoir to said fluid inlet of said pump means,
 a windmill for operating said pump means for pumping fluid from said reservoir to said fluid driven power means for operation thereof,
 temperature conditioning means having a compressor means adapted to be driven by said mechanical output of said fluid driven power means, and
 means coupled to said reservoir for utilizing the heat of said operating fluid in said reservoir and result- ing in part from the inefficiency of said pump means and from said fluid driven power means.

2. The system of claim 1, wherein:

said conduit means for providing fluid communication from said fluid outlet of said pump means to said fluid inlet of said fluid driven power means is defined as a first conduit means, said conduit means for providing fluid communication from said fluid outlet of said fluid driven power means to said reservoir is defined as a second conduit means, said system comprising:

pressure operated valve means coupled from said first conduit means to said second conduit means for providing a fluid flow path bypassing said fluid driven power means when the pressure of the fluid in said first conduit means exceeds a preset level.

3. The system of claim 1 wherein:

said conduit means providing fluid communication from said fluid outlet of said pump means to said fluid inlet of said fluid driven power means is defined as a first conduit means, said system comprising:

accumulator means coupled in fluid communication with said first conduit means for storing fluid under pressure for use for operating said fluid driven power means during periods of low wind velocity.

4. The system of claim 1 wherein:

said conduit means for providing fluid communication from said reservoir means to said fluid inlet of said pump means is defined as a return conduit means, said system comprising:

heat exchanger means having a fluid inlet and a fluid outlet, said fluid outlet of said heat exchanger being coupled to said return conduit means, and temperature controlled valve means coupled to said return conduit means and to said fluid inlet of heat exchanger means for directing fluid to said fluid inlet of said pump means when the temperature of the fluid in said return conduit means is below a preset level and for directing fluid to said heat exchanger means when the temperature in said return conduit means is above said preset level.

5. A system for extracting useful energy from the wind, comprising:

pump means having a fluid inlet and a fluid outlet, fluid driven power means having a fluid inlet, a fluid outlet, and a mechanical output, conduit means for providing fluid communication from said fluid outlet of said pump means to said fluid inlet of said fluid driven power means and from said fluid outlet of said fluid driven power means to said fluid inlet of said pump means, wind operated means for operating said pump means for pumping fluid to said fluid driven power means for operation thereof, and temperature conditioning means having a compressor means adapted to be driven by said mechanical output of said fluid driven power means.

6. A system of claim 5 wherein:

said conduit means for providing fluid communication from said fluid outlet of said pump means to said fluid inlet of said fluid driven power means is defined as a first conduit means, said conduit means for providing fluid communication from said fluid outlet of said fluid driven power means to said fluid inlet of said pump means is defined as second conduit means, said system comprising:

pressure operated valve means coupled from said first conduit means to said second conduit means for providing a fluid flow path bypassing said fluid driven power means when the pressure of the fluid in said first conduit means exceeds a preset value.

7. The system of claim 5 wherein:

said conduit means for providing a fluid communication from said fluid outlet of said pump means to said fluid inlet of said fluid driven power means is defined as a first conduit means, said system comprising:

accumulator means coupled in fluid communication with said first conduit means for storing fluid under pressure for operating said fluid driven power means when the wind velocity is low.

* * * * *